April 7, 1931. P. F. KURTENBACH 1,799,982
CORN PICKER AND HUSKER
Filed Nov. 7, 1928 6 Sheets-Sheet 2

Fig. 2.

INVENTOR.
P. F. Kurtenbach.
BY
Lacey & Lacey, ATTORNEYS

April 7, 1931. P. F. KURTENBACH 1,799,982
CORN PICKER AND HUSKER
Filed Nov. 7, 1928    6 Sheets-Sheet 4

INVENTOR.
P. F. Kurtenbach.
BY
Lacey & Lacey, ATTORNEYS

Patented Apr. 7, 1931

1,799,982

UNITED STATES PATENT OFFICE

PRESTON F. KURTENBACH, OF BRANDT, SOUTH DAKOTA

CORN PICKER AND HUSKER

Application filed November 7, 1928. Serial No. 317,760.

This invention relates to corn harvesters and has for its object the provision of a compact and efficient machine whereby the ears of corn will be stripped from the standing stalks and the husks removed, the husks being deposited upon the ground or otherwise disposed of while the ears of corn and any possible shelled corn will be delivered into a wagon or other receptacle at the side of the harvester. The invention provides means for effectually snapping the ears from the stalks and preventing clogging of the stalks and the ears as they are acted upon by the snapping elements. The invention also provides means whereby the ears of corn will be diverted toward the sides of the machine to be easily engaged by the husking elements and the positive engagement of the husks by said elements effected while provision is made for adjusting the husking rolls and preventing loss of any shelled corn. The invention is illustrated in the accompanying drawings and consists in certain novel features which will be hereinafter first fully described and then more particularly pointed out in the appended claims.

Figure 2:
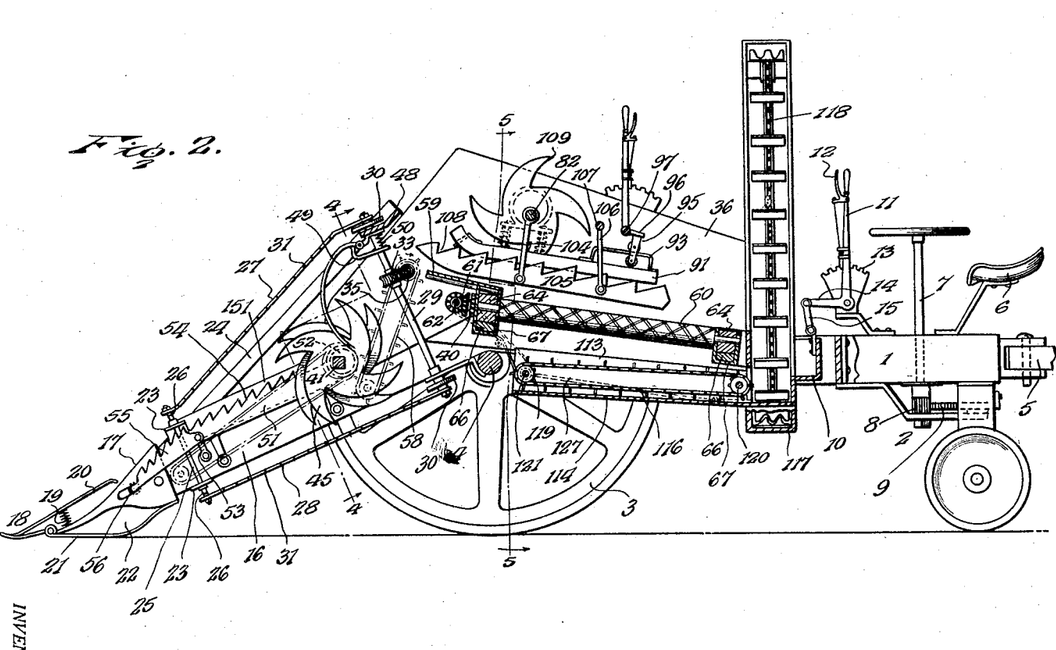
Fig. 2 is a vertical longitudinal section of the same.
Figure 3:
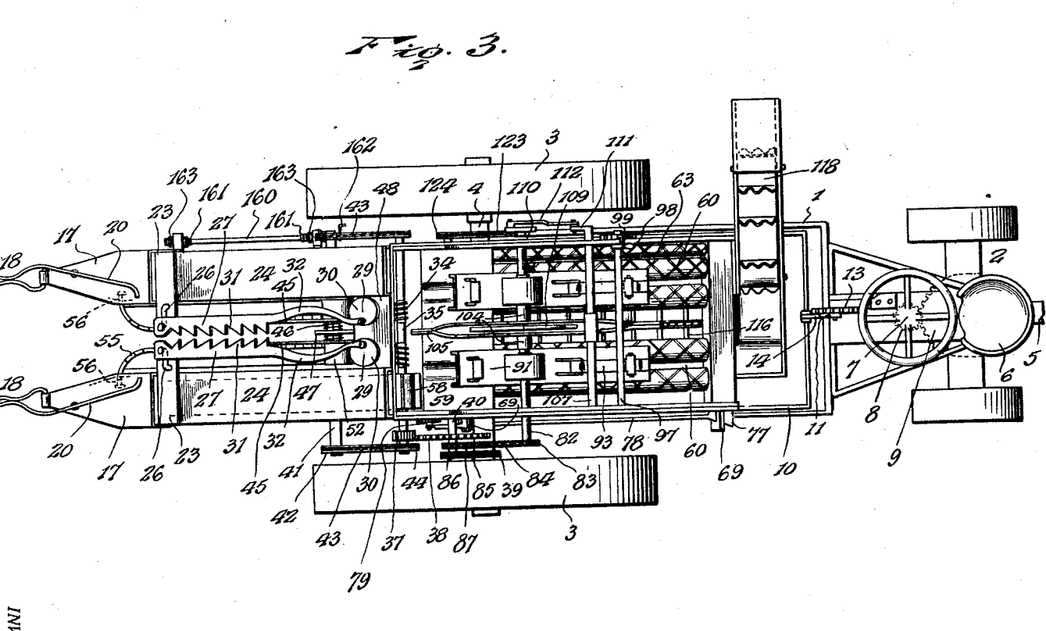
Fig. 3 is a plan view.

The frame of the machine may be of any suitable form and includes side bars or sills 1 supported at the rear by a steering truck 2 and at the front by traction wheels 3 secured upon an axle 4 which extends transversely of the frame. A draft tongue 5 is pivoted to the rear end of the main frame, as indicated in Figs. 2 and 3, and this draft tongue may be coupled to a tractor or carry devices whereby a draft team may be hitched thereto, the machine being pushed forwardly over the field in an obvious manner. At the rear end of the main frame is a seat 6 and adjacent and in front of said seat is a steering shaft 7 equipped with a hand wheel at its upper end and provided at its lower end with a pinion 8 meshing with a segment 9 fixed to the support for the rear truck wheels whereby the machine may be easily steered so as to maintain the corn-picking and gathering elements in proper relation to the row of plants.

Figure 1:
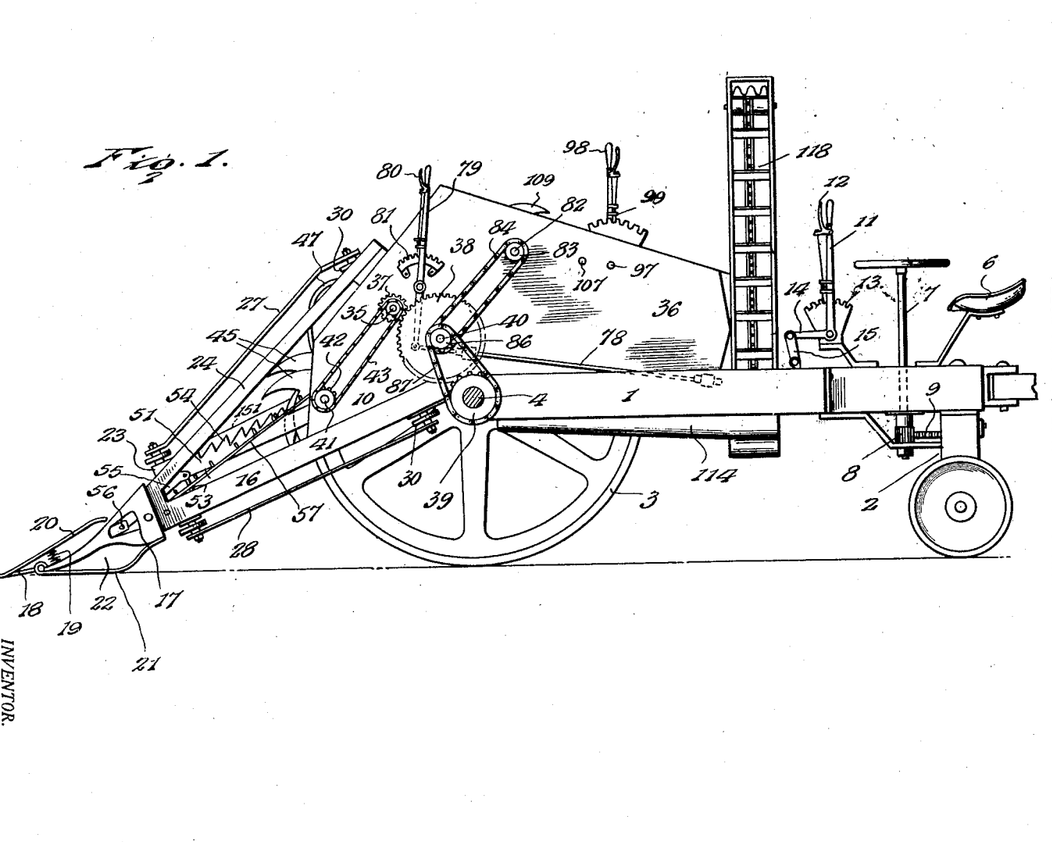
Figure 1 is a side elevation of a machine embodying my present invention.

Pivotally supported by the axle 4 is a supplemental frame 10 and upon the main frame adjacent the rear end of the supplemental frame is mounted a hand lever 11 having a latch 12 cooperating with a segment 13 in the usual manner to maintain the lever in a set position. From the lower end of said lever, a crank arm 14 extends forwardly and a link 15 connects said crank with the rear end of the supplemental frame. By properly rocking the hand lever, the rear end of the frame may be raised or lowered and the front extremity thereof set to run upon the ground or held above the same as circumstances may suggest. The forward end of the supplemental frame extends downwardly and forwardly and presents two parallel troughs or chutes 16 between which the stalk-engaging and ear-snapping elements are mounted. To the front extremity of each trough is pivotally secured a horn 17 which, as shown in Figs. 1 and 3, is tapered forwardly and downwardly so that it may readily pass under any bent over or fallen stalks, and to facilitate the lifting of the stalks a shoe or runner 18 is pivoted upon the front end of each horn and normally held with its front extremity resting upon the ground by an expansion spring 19 disposed between the horn and the rearwardly extending portion 20 of the shoe. The shoe or runner 18 is preferably of an open form and may be conveniently bent from a single length of stout wire or light rod, the form of the shoe enabling it to run easily over the surface of the ground and pass under the fallen and bent over stalks so as to lift the same. It will also be noted that the runners on their inner sides converge rearwardly and that the horns 17 also converge rearwardly at their inner sides whereby the stalks will be directed toward the central longitudinal plane of the machine to be properly engaged by the gathering and snapping elements. A second shoe or runner 21 is fixed to the under side of each horn and this shoe or runner is likewise of a skeleton form and supports the rear portion of the horn in an elevated position, an open space 22 being thereby left between the shoe and the horn through which any dirt which may be clinging to the plants may sift out so that the ears of corn which will pass through the machine will be cleaned and sand and other matter clinging thereto will not be carried to the working elements to clog the action thereof. Mounted in brackets or bearing arms 23, secured upon the chutes 16 and frame bars or covers 24, which extend upwardly and rearwardly above the chutes, are approximately vertical shafts 25, the said shafts being disposed at the inner sides of the chutes and being provided with cranks 26 at their upper and lower ends. Upon these cranks are pivotally mounted the front ends of the stalk-holding and feeding bars 27 and 28, the upper bars 27 being disposed above and at the inner sides of the respective frame plates 24 while the lower bars 28 are disposed below and at the inner sides of the chutes 16. At the rear of the downwardly and forwardly inclined portion of the supplemental frame are shafts 29 which are disposed parallel with the shafts 25 and which are equipped with crank disks 30 at their upper and lower ends, the rear ends of the stalk-gathering arms or bars 27 and 28 being pivoted upon wrist pins carried by said crank disks. As the shafts 29 are rotated, a vibratory motion will be transmitted to the respective stalk-engaging arms 27 and 28, and said arms will be caused to approach or recede from the stalks so that the stalks will be supported while the ears are being snapped therefrom, and to insure proper engagement of these arms with the stalks the inner opposed edges of the several arms are constructed with teeth 31 to provide seats for the stalks, as will be understood, whereby the stalks cannot bend backward and will be firmly held for the action of the snapping elements. The upper arms 27 have their rear end portions bowed outwardly, as shown at 32, so that the stalks may readily move relatively downwardly to pass below the axle 4 and the main portion of the machine. The shafts 29 are each equipped with a worm gear 33 meshing with a worm 34 on a transverse shaft 35 journaled in the side plates 36 of the supplemental frame and equipped at one end with a pinion 37 meshing with a spur gear 38 which is secured upon a transverse shaft 40 mounted in the side plates 36 above and somewhat in advance of the axle and extending entirely across the machine, as shown in Fig. 6.

Figure 4:
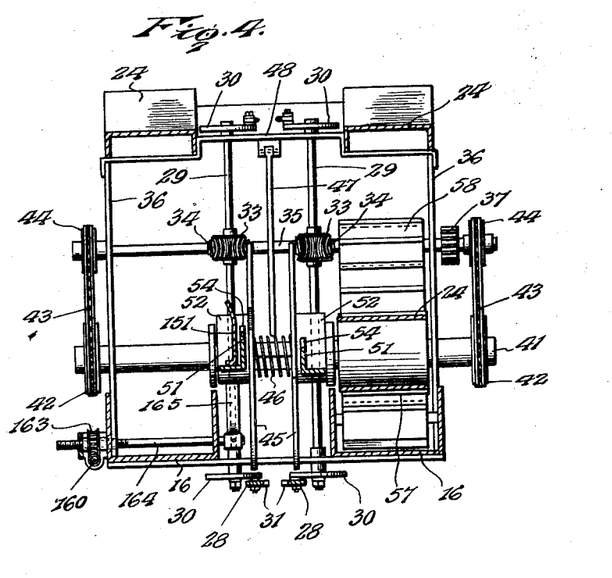
Fig. 4 is a transverse section on the line 4—4 of Fig. 2.

Extending across the forward portion of the supplemental frame at a point in advance of the shafts 29 is transverse shaft 41 which is equipped at its ends with sprockets 42 each operatively connected by a chain 43 with a sprocket 44 secured upon the shaft 35, and at the center of the shaft 41 there is fitted a pair of snapper disks 45 each consisting of a plurality of arcuate blades adapted to cut through the stems of the ears of corn and thereby release the ears from the stalks. Upon referring to Fig. 2, it will be noted that the shaft 41 is angular in cross section and the cutters or snappers are provided with correspondingly shaped central openings whereby, when they are fitted upon the shaft, they will be forced to rotate therewith. They do, however, have a slight sliding movement upon the shaft and are held apart by a spring 46 coiled around the shaft between the snappers, as shown in Figs. 3 and 4. The yieldable mounting of these snapping blades will permit them to yield somewhat to the ears so that clogging of the ears between the blades is not apt to occur. It is also to be noted that the blades or teeth of one disk are set somewhat in advance of the blades or teeth of the other disk so that the ears of corn will be turned to one side to pass onto a conveyer presently described. A checking arm 47 is arranged between the snapper blades 45 and is of an arcuate formation, as shown clearly in Fig. 2, this arm being pivoted to a cross bar 48 of the supplemental frame which cross bar provides bearings for the upper ends of the shafts 29, and at its upper end this arm 47 is formed with a rearward extension or finger 49, against which a spring 50 presses, the spring being disposed between the free end of said finger and the cross bar 48, as shown in Fig. 2. The spring holds the arm in its forward position so that any ears which may be between the snapper blades 45 will be stopped from further rearward travel and will be shifted over into the chute 16. At the same time, the arm is permitted to yield to the impact of the ears of corn so that the corn will not be broken or so injured that it will be unfit for use. Adjacent the inner side of each chute 16 and just above the same is a snapper arm 51 which has its upper or rear end hung upon an eccentric upon the shaft 41, as indicated at 52, while the lower end of this snapper arm is carried by a substantially upright link 53 pivoted at its lower end upon the side of the adjacent chute. The upper edge of each snapper arm is serrated, as shown at 54, whereby it is given a saw tooth formation and is adapted to cut through the stems of the ears of corn to separate the same from the stalks, it being understood that the snapper blades 45 are provided to insure the removal of any ears which may remain upon the stalks after the snapping arms 51 have acted thereon and also to assure the removal of any ears which may be carried by portions of stalks which happen to be broken by the action of the snapping arms. As shown most clearly in Fig. 4, the working edge of one snapping arm is set somewhat higher than the other arm so that the snapped off ears will be turned to the conveyer side of the apparatus. A shield 151 is provided adjacent the higher snapping arm, as shown in Fig. 4, to prevent the ears passing over the arm. To the front end of each snapping arm 51 is pivotally attached a short arm 55 of similar formation which has its front extremity formed into a laterally diverging hook 56 fitted through the inner side of the adjacent horn 17 and headed therein so that it cannot be readily withdrawn. The short secondary arm 55 is curved outwardly, as shown in Fig. 3, so that the two arms will cooperate to direct the stalks into the central line of the machine where they may be readily and effectually engaged by the arms 27 and 28 and the snapping arms 51. It will be readily understood that the action of the eccentrics 52 causes the snapping arms 51 to oscillate in vertical planes so that the teeth on their upper edges will move upwardly alongside the corn stalks and readily cut through the stems projecting therefrom. As before stated and as clearly shown in Fig. 4, the snapping arms 51 are so disposed that the ears snapped from the stalks will fall over into the conveyer chute. Within one chute 16 is a conveyer 57 in the form of an endless belt with cross slats thereon having its rear end carried by a drum secured upon the shaft 41 and its front end trained about a drum or roller journaled in the sides of the chute near the front extremity of the same. The conveyer receives the ears from the snapper arms and disks and delivers them onto an elevator 58, similar in form to the conveyer, and having its lower end trained around a roller or drum mounted within the chute immediately below the rear end of the conveyer and having its upper end or bight trained about a drum secured on the shaft 35.

It is frequently desirable to adjust the snapping arms laterally to accommodate stalks of greater or less diameter. For this purpose, a longitudinal shaft 160 may be mounted on the outer side of the right hand trough-like frame 16 and equipped with worms 161 and a handle 162 whereby it may be operated. The worms 161 mesh with worm pinions 163 having threaded bores through which are engaged the outer threaded ends of rods 164 slidably mounted through the frame 16 and carrying at their inner ends uprights 165 which are connected to the mountings for the right hand snapper arm 54.

Figure 6:
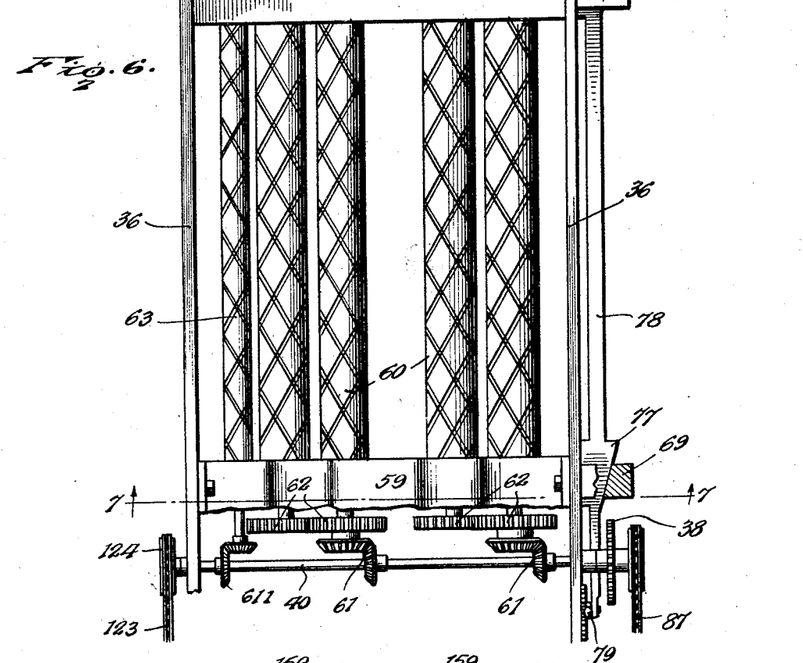
Fig. 6 is an enlarged plan view of the husking rolls and the means for driving and adjusting the same.
Figure 7:
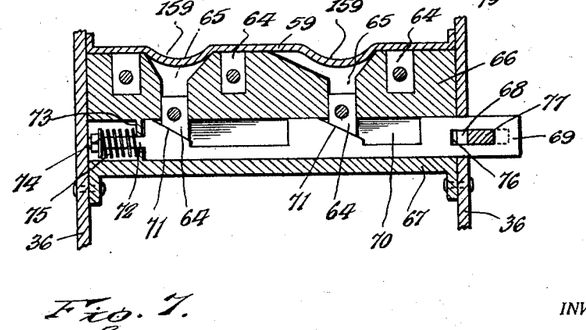
Fig. 7 is a section on the line 7—7 of Fig. 6.

A table 59 extends between the side plates 36 in position to receive the ears of corn from the elevator 58, and this table serves also as a protective cover for the gearing driving the snapping rolls 60 which are arranged in pairs, as shown clearly in Fig. 6, and are driven from the shaft 40 through beveled gearing 61 connecting the shaft 40 with the trunnion or axle of the outer roll of each pair, and spur gears 62 which operatively connect the axles or trunnions at the front ends of cooperating rollers. There is also provided a roller 63 at the right hand side of the machine which is disposed adjacent the side of the supplemental frame and serves to direct the ears of corn toward the left side of the machine in order that all the ears may pass to the discharge elevator, said roller 63 being driven, counter to the husking rollers, by gearing 611 from the shaft 40. The husking rolls have their journals fitted in bearing boxes 64 which are disposed in slots or notches 65 provided therefor in cross bars or blocks 66 housed in channels 67 arranged respectively adjacent the front and rear ends of the rolls and secured rigidly to the side plates 36 of the supplemental frame. Upon reference more particularly to Fig. 7, it will be noted that the table or cover 59 has a cross sectional contour conforming closely to the block or bar 66 and providing channels 159 to direct the ears to the husking rolls. One frame plate 36 is provided with slots 68 each accommodating a slide 69 which rests in the channel 67 and engages a groove 70 in the lower edge of the respective block 66. Each slide 69 has obliquely disposed portions 71 on its upper edge and the bearing boxes 64 of the driven husking rolls rest upon these inclined portions and have their lower edges correspondingly inclined so that, if the slides be shifted endwise, they will exert a wedging action on the boxes to effect raising or lowering of the same. By properly setting the slides, therefore, the boxes may be adjusted vertically and the husking rolls set to operate at any desired distance apart. The inner end of each slide 69 is constructed with a tenon or tongue 72 passing through a guide web 73 of the block 66 and having a washer or abutment 74 upon its end, an expansion spring 75 being coiled around the tenon between said abutment and the web 73 so that the slide will be yieldably held normally in its innermost position. In the outer end portion of each slide is formed a longitudinal slot 76 and passing through this slot is a wedge 77 forming a part of a shifting bar 78, the wedges bearing between the outer end of the respective slot 76 and the side of the frame plate 36, as will be understood upon reference to Fig. 6. To the front end of the bar 78 is pivoted the lower end of a hand lever 79 which is fulcrumed upon the adjacent side plate 36 and is equipped with a latch 80 cooperating with a holding segment 81 in the usual manner. By properly rocking this hand lever, the bar 78 may be shifted longitudinally and the slide 69 consequently moved inwardly or outwardly to obtain the proper adjustment of the husking rolls. The table 59 is inclined downwardly and rearwardly and the husking rolls are also similarly inclined, as will be understood upon reference to Fig. 2, so that the ears of corn deposited on the table will naturally gravitate onto the husking rolls which will grasp the husks and strip them from the ears and pass them downwardly between the opposed surfaces of the cooperating rolls.

Figure 5:
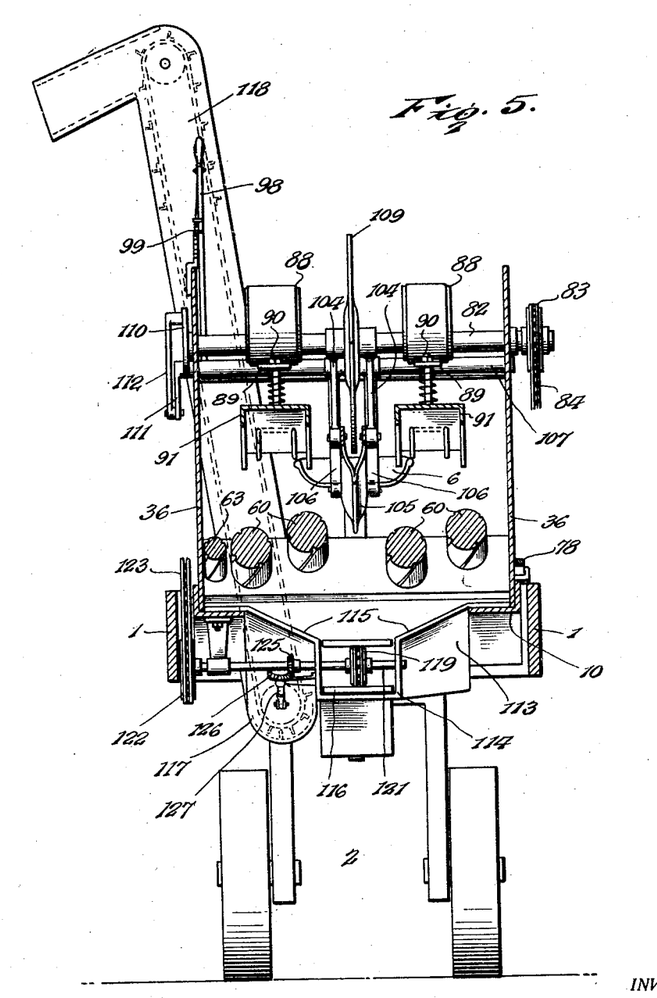
Fig. 5 is a transverse section on the line 5—5 of Fig. 2.
Figure 8:
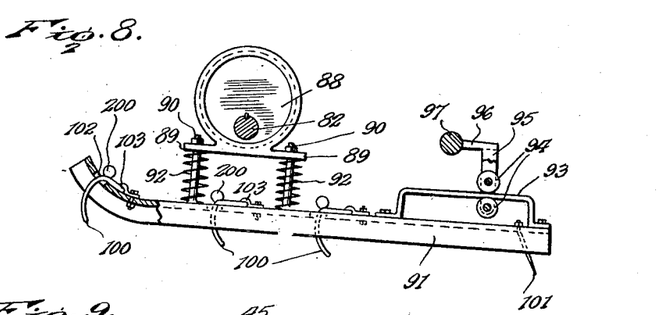
Fig. 8 is an enlarged detail view of the ear retarder and feeding mechanism.
Figure 9:
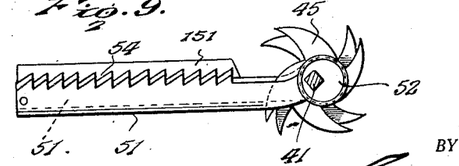
Fig. 9 is a detail view of the snapper arm.

To insure the proper effectual engagement of the husks by the husking rolls, I provide the feeding and retarding devices shown in Fig. 2 and illustrated more in detail in Figs. 5 and 8. A transverse shaft 82 is mounted in and extends between the side plates 36, and this shaft 82 is provided with a sprocket 83 about which is trained a chain 84 passing also around a sprocket 85 on the shaft 40, said shaft being also equipped with a sprocket 86 receiving motion through a chain 87 from the sprocket 39 on the axle. Between the side plates 36 the shaft 82 carries eccentrics 88 to the straps of which are fixed lugs 89 having suspending bolts 90 fitted therein. The lower ends of these suspending bolts 90 are secured in any approved manner to the tops of the longitudinally extending presser members 91 which are in the form of inverted channels, as will be understood upon reference to Figs. 5 and 8. Expansion springs 92 are fitted about these suspension bolts between the respective lugs 89 and the channel presser member 91 whereby the presser channel may yield to the bulk of corn below the same but at the same time will exert sufficient pressure on the corn to hold the same to the husking rolls, it being noted that each of these feeding and pressing channel members is disposed vertically over a pair of husking rolls. On the rear end portion of each presser member 91 is secured a longitudinally extending loop 93 upon the upper and lower sides of which are engaged rollers 94 carried by a hanger 95 which depends from a crank arm 96 extending rearwardly from a rock shaft 97 which is journaled in the side plates 36, as will be understood. At one end of the rock shaft 97 is a hand lever 98 and a latch mechanism 99 whereby the hangers may be set to support the rear ends of the feeding and presser members in a desired relation to the husking rolls. Each member 91 carries a series of hooks 100 and prongs 101, the hooks being mounted upon the member in such manner that they may yield somewhat to the corn when the member is moving forwardly but will engage the corn and feed it along the husking rolls when the member swings rearwardly, weights or enlargements 200 being preferably provided to hold the hooks to their work. The hooks are of arched formation having the bridging portion resting on the top of the channel and their side portions extending through slots 102 in the top of the channel member. A clip 103 is secured upon the top of the channel member 91 immediately adjacent each pair of hooks or prongs and has its edge formed into a hook-like element adapted to span the bridging portion of the corn-engaging hooks or prongs and thereby retain the same in place. It will be understood that, as the shaft 82 rotates, the members 91 will be oscillated longitudinally of the machine so that they will be not only moved forwardly and rearwardly but will also be moved upwardly and downwardly and during the rearward movement the prongs and hooks carried thereby will engage the ears of corn upon the table 59 and feed the same onto and along the husking rolls and will exert sufficient pressure on the corn to hold the same to the rolls and enable the rolls to efficiently grasp the husks and strip them from the ears.

Suspended on the shaft 82 between the eccentrics 88 are hangers 104 and to the lower ends of these hangers are pivoted the forward portions of a two-ply spreader and separator 105, the rear portion of the spreader being carried by hangers 106 suspended from a cross rod 107. The spreader and separator 105 comprises two plies or leaves joined along their lower edges, as shown in Fig. 5, and provided with saw teeth 108 along their upper edges, the front ends of the two plies being turned upwardly, as shown in Fig. 2, and joined, as shown in Fig. 3. It will be noted that this divider and separator is disposed in the central longitudinal plane of the machine and it serves to divert the ears of corn from the table 59 to both sides so that the corn will be directed onto the husking rolls and will not accumulate in the middle of the machine where it would not be treated. The shaft 82 also carries a separator 109 which is located between the plies or members of the spreader and separator 105 and consists of a plurality of blades having arcuate edges. This divider 109 will, of course, rotate with the shaft 82 and will move forwardly against the ears of corn which may lodge on the separator and spreader 105 and will cooperate with the latter to push aside all such ears so that they will be caused to pass under the feeding elements 91. The saw teeth 108 will reduce the seating surface presented for the ears of corn and, consequently, the ears cannot readily find permanent lodgment on the spreader but any ears that should lodge thereon will be at once swept aside by the action of the revolving divider 109. Referring to Figs. 3 and 5, it will be noted that the shaft 82 is provided at the end opposite the sprocket 83 with a crank disk 110 and the rod 107 is provided at its corresponding end with a crank 111, a link 112 connecting the crank 111 with a wrist pin on the disk 110 so that as the shaft 82 is rotated an oscillatory movement will be imparted to the hangers 106 and, consequently, a reciprocatory motion will be given the spreader 105 so that it will efficiently act upon the ears of corn to dislodge the same and turn them over to the husking rolls.

Below the husking rolls, a receiver 113 is carried by the supplemental frame, this receiver comprising a central trough 114 and diverging walls 115 extending from the sides of the trough. The receiver extends from side to side of the frame so that all husks passing from between the husking rolls will be diverted into the trough 114, and a drag conveyer 116 is mounted in this trough to carry off the husks, the ears of corn passing over the rear ends of the husking rolls into the pocket 117 of an endless elevator 118 whereby they will be carried laterally from the machine and may be delivered into a bag or other receptacle or into a wagon driven alongside the harvester. The drag conveyer 116, as shown most clearly in Fig. 5, consists of a sprocket chain to which are attached cross bars at equal intervals, the husks being caught by the upper run of the conveyer and discharged at the front of the same below the axle while any shelled corn which may pass from the husking rolls will be caught in the bottom of the trough 114 and dragged therefrom to be caught in the pocket of the elevator.

The drag conveyer 116 includes a central sprocket chain, as has been stated. This chain is trained about front and rear sprockets 119 and 120, and the shaft 121 carrying the front sprocket is extended to one side and has a sprocket 122 secured on its outer end, a chain 123 passing around said sprocket and a sprocket 124 on the adjacent end of the shaft 40 so that the desired motion will be imparted to the drag conveyer. Upon the shaft 121 is a beveled pinion 125 meshing with a similar pinion 126 on the front end of the elevator driving shaft 127 which extends rearwardly and has its rear end journaled in the elevator casing and connected to the drum or roller about which the lower bight of the elevator is trained.

Having thus described the invention, I claim:

1. In a corn harvester, the combination of gathering members, vibratory snapping arms set on edge and extending rearwardly from said gathering members and having serrated upper edges, means for operating said arms whereby to snap ears of corn from standing stalks, and means for receiving the snapped ears and conveying them to points in rear of the snapping arms.

2. In a corn harvester, the combination of gathering members, snapping arms mounted on edge at the rear and at the inner sides of said gathering members and provided with serrated upper edges, means for vibrating said snapping members whereby to sever ears of corn from the standing stalks, means for carrying away the severed ears, and supplemental arms pivotally attached to the front ends of the snapping arms and diverging forwardly to the gathering members.

3. In a corn harvester, the combination of gathering members, snapping arms mounted between said members, means for vibrating said arms whereby to detach ears of corn from standing stalks, and vibratory stalk-supporting arms mounted respectively above and below the snapping arms and operable to hold the stalks while the ears are being removed.

4. In a corn harvester, the combination of parallel frame members, horns carried by the front ends of said frame members, shoes attached to the under sides of said horns to run on the ground and having their intermediate portion spaced from the horns, and supplemental shoes pivoted to the front ends of the horns to run on the ground in advance of the same and direct stalks to the space between the horns and said frame members.

5. In a corn harvester, the combination of parallel frame members, horns carried by the front ends of said frame members to engage stalks and direct them into the space between said members, stalk-holding arms arranged in pairs respectively above and below said frame members, means for causing the members of the respective pairs of arms to approach and recede, means within the frame members for carrying away severed ears of corn, and means between said frame members and said pairs of arms to remove ears of corn from the stalks.

6. In a corn harvester, the combination of parallel frame members, means at the front ends of said frame members to direct stalks therebetween, vibratory snapping arms supported between said frame members and operable to remove ears of corn from the stalks, a pair of rotatable snappers mounted at the rear ends of said snapping arms and disposed between them, and a divider bar yieldably mounted between said snappers.

7. In a corn harvester, the combination of means for removing ears of corn from the stalks, conveyers receiving the ears of corn from said means, a table at the rear of the conveyers onto which the ears are discharged, husking rolls extending rearwardly from said table with their front ends at the rear edge of the table and receiving the ears directly therefrom, and oscillating devices above the husking rolls for holding the ears of corn to said rolls and feeding them along the rolls.

8. In a corn harvester, the combination of means for removing ears of corn from the stalks, conveyers receiving the removed ears of corn, husking rolls to which the ears of corn are delivered by said conveyers, oscillating devices arranged longitudinally above the husking rolls to hold the ears of corn to the rolls and feed them along the same, and a spreader suspended above the rolls between and parallel with said oscillating devices for diverting the ears of corn to the pairs of husking rolls.

9. In a corn harvester, the combination of means for removing ears of corn from stalks, conveyers receiving the removed ears, husking rolls to which the ears are delivered by the conveyers and arranged in pairs, devices mounted for oscillation over the respective pairs of rolls for holding the ears of corn to the rolls and feeding them along the same, a spreader disposed between the last-mentioned devices, and a rotatable divider cooperating with said spreader.

10. In a corn harvester, the combination of means for removing ears of corn from stalks, conveyers receiving the ears from said means, pairs of husking rolls at the rear of the conveyers, retarders mounted above the respective pairs of rolls and including elements yieldable to the ears of corn when moving in one direction and engaging the ears of corn when moving in the opposite direction whereby to hold the ears of corn to the husking rolls and feed them along the rolls, a spreader between said retarders, means for oscillating the retarders, and means for oscillating the spreader.

11. In a corn harvester, the combination of means for removing ears of corn from stalks, conveyers receiving the removed ears of corn, pairs of husking rolls arranged at the rear of the conveyers, means for holding the ears of corn to said rolls and feeding them along the rolls, a trough below the husking rolls in a vertical longitudinal plane passing between the pairs of rolls, the trough having side walls diverging upwardly whereby to receive the husks and shelled corn from all the rolls, and a drag operating in said trough to remove the husks in one direction and the shelled corn in the opposite direction.

12. In a corn harvester including pairs of husking rolls, bearings for said rolls, stationary blocks receiving said bearings, some of the bearings being movable vertically through the block and provided with inclined lower sides, slides arranged below the blocks and having wedging portions engaging said inclined under sides of the bearings, means for yieldably holding the slides in one position to retain said bearings relatively lowered, and means for actuating the slides to lift the bearings.

13. In a corn harvester, the combination of gathering members, snapping arms set on edge at the rear and at the inner sides of said gathering members and provided with serrated upper edges, means for vibrating said snapping arms whereby to sever ears of corn from standing stalks, means for carrying away the severed ears, and supplemental arms pivoted at their rear ends to the front ends of the snapping arms and diverging therefrom to the gathering members and having their front ends slidably connected with said members, the supplemental arms also having serrated upper edges.

14. In a corn harvester, the combination of parallel frame members, horns carried by the front ends of said frame members and having their inner sides converging rearwardly to direct the stalks into the space between said members, shoes pivoted to the front ends of the horns to run on the ground in advance of the horns and having upper portions extending rearwardly over the horns, and expansion springs disposed between and bearing against the horns and said rearwardly extending portions of the shoes.

15. In a corn harvester, the combination of parallel frame members, gathering elements at the front ends of said members to direct stalks therebetween, vibratory snapping arms supported between said frame members and operable to remove ears of corn from the stalks, and rotatable snappers between the rear ends of the snapping arms.

16. In a corn harvester, the combination of a frame including parallel side members, gathering elements at the front ends of said side members to direct stalks therebetween, vibratory snapping arms mounted between said side members and operable to remove ears of corn from the stalks, rotatable snappers mounted between the rear ends of the snapping arms, a divider bar pivoted to a fixed frame member above the rotatable snappers and depending therefrom between the rotatable snappers, a rearwardly extending finger on the divider bar, and an expansion spring disposed between and bearing against said finger and the fixed frame member.

17. In a corn harvester, the combination of gathering members, links pivoted at their lower ends on the inner sides of the respective gathering members, a transverse shaft at the rear of said links, eccentrics on said shaft, and snapping arms having their rear ends carried by said eccentrics and their front ends pivoted to the upper ends of the respective links.

18. In a corn harvester, the combination of a frame including side members, gathering elements at the front ends of said side members, approximately vertical shafts carried by the side members at the front and the rear thereof, cranks on the upper and lower ends of said shafts, stalk-supporting arms mounted at their front ends on the front cranks and at their rear ends on the rear cranks, and means for rotating the rear shafts.

19. In a corn harvester, the combination of means for snapping ears of corn from standing stalks, a transverse downwardly and rearwardly inclined table receiving the ears of corn, said table having grooves in its upper side opening through its rear edge, and husking elements at the rear of the table, the grooves in the table being alined with the spaces between the husking elements.

20. In a corn harvester, the combination of means for removing ears of corn from standing stalks, husking rolls at the rear of said means, means for transferring the ears to the husking rolls, a presser bar disposed over the space between cooperating husking rolls, means for slidably and pivotally suspending the rear end of said bar, and means acting on the front end of the bar for oscillating the bar.

21. In a corn harvester, the combination of means for removing ears of corn from standing stalks, husking rolls at the rear of said means, means for transferring the ears to the husking rolls, a presser bar suspended above the husking rolls, means for oscillating said bar, rearwardly curved hooks hinged upon and depending from said bar, means for yieldably holding the hooks in lowered position, and means for limiting the downward movement of the hooks.

22. In a corn harvester, the combination of means for removing ears of corn from standing stalks, husking rolls at the rear of said means, means for transferring the ears to the husking rolls, a transverse shaft above the husking rolls, an eccentric on said shaft, an eccentric strap encircling the eccentric and having oppositely projecting lugs on its under side, suspending bolts fitted through said lugs, a presser bar carried by the lower ends of said bolts, expansion springs fitted on the suspending bolts between the lugs and the presser bar, and means for slidably and pivotally suspending the rear end of the presser bar.

23. In a corn harvester, the combination of means for removing ears of corn from standing stalks, husking rolls at the rear of said means, means for transferring the ears to the husking rolls, a presser bar disposed above the husking rolls, means connected with the front end of the bar for suspending the same and imparting an oscillatory movement thereto, a longitudinal loop on the rear end portion of the bar, and a hanger engaged with said loop.

In testimony whereof I affix my signature.

PRESTON F. KURTENBACH. [L. S.]